May 14, 1935.  R. KRŇANSKÝ  2,001,144

DOWEL PIN

Filed April 9, 1934

Inventor.
Rudolf Krňanský

Patented May 14, 1935

2,001,144

UNITED STATES PATENT OFFICE 2,001,144

DOWEL PIN

Rudolf Krňanský, Montreal, Quebec, Canada

Application April 9, 1934, Serial No. 719,713

5 Claims. (Cl. 20—92)

My invention relates to the connecting of toy wooden blocks or wooden blocks of any size, as the case may be, and the objects of my invention are: primarily, to enable children to make use of wooden blocks in multiple ways, being able to assemble and dissemble easily various structures and models built up from the said blocks; secondly, to supply a new means of connecting any size of wooden blocks or blocks made from other material which are destined to be joined firmly together either temporarily or permanently as the said dowel pins could be made in any length and in any width to suit the size of these blocks. The dowel pins are composed of two pieces and are made in two slightly different forms: one with straight outside surface and the other with curved outside surface, both working the same way and serving identical purposes as described below:

Figure 1:
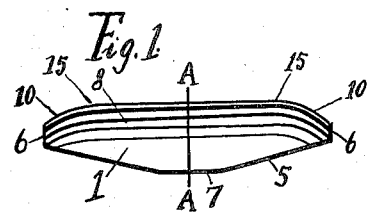
Figure 1 shows the side view of the dowel pin with straight outside surface.

Referring to the drawing:

The dowel pins 1 and 2 are made of half round wooden pegs or any other resilient material.

Figure 2:
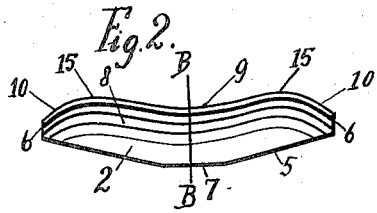
Figure 2 shows the side view of the dowel pin with curved outside surface.
Figure 3:
Figure 3 shows section A—A of the dowel pin with the straight outside surface.
Figure 4:
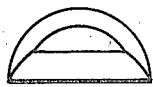
Figure 4 shows the end view of the dowel pins.
Figure 5:
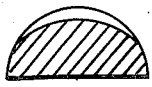
Figure 5 shows the section B—B of the dowel pin with the curved outside surface.

The contacting or inside surface 5 (Figure 1 and Figure 2) of both dowel pins 1 and 2 are flat and recede from the axis at the centre towards each end 6 of dowel pins 1 and 2 so as to form almost a blunt point. The centre of the said inside surface 5 of dowel pins 1 and 2 forms a short straight base 7. The outside surface 8 of both dowel pins 1 and 2 are semi-cylindrical and while the said outside surface 8 of dowel pin 1 is straight, the outside surface 8 of dowel pin 2 is curved 9 in the centre. The ends 10 of both dowel pins are bevelled so as to form almost a blunt point, thus enabling the insertion of the dowel pins, when used in combination, in the bores of blocks as shown by Figure 6 and Figure 8.

Figure 6:
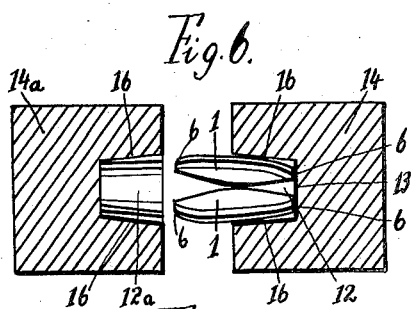
Figure 6 shows dowel pins inserted in block with tapered holes and in position before blocks are joined.
Figure 8:
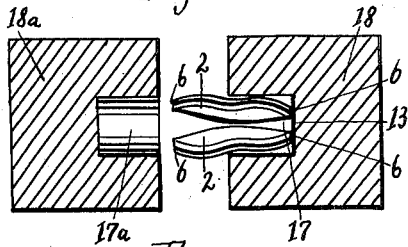
Figure 8 shows the dowel pins used in block with straight holes and in position before blocks are joined.

Both dowel pins 1 and 2 are used in combination of two (Figure 6 and Figure 8). However, each kind has to be used in connection with different bores.

Figure 7:
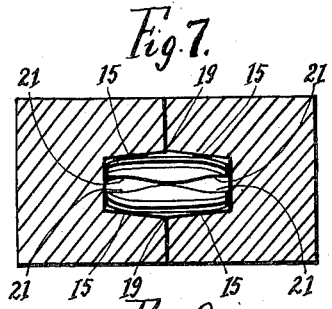
Figure 7 shows the two blocks joined together with dowel pins in position.

The dowel pins 1 with straight outside surface 8 are used in connection with tapered bores 12 (Figure 6). These dowel pins 1 in combination of two (Figure 6) are inserted in one of the tapered bores 12, the ends 6 of the said dowel pins touching the back 13 (Figure 6) of that bore 12. The disengaged ends 6 of dowel pins 1 are then inserted in the bore 12ª of the opposite block 14ª. The dowel pins 1 being made of a resilient material—and are originally a little wider at point 15 (Figure 1) when used in combination of two than the diameter of the tapered bores at point 16 of blocks 14 and 14ª, said diameter at point 16 being about half way down bores 12 and 12ª—are by insertion and progressive pressure on the two blocks 14 and 14ª to be connected, reduced to a smaller diameter than the said bores at point 16, their contractibility cooperating with the said two blocks, holding them tightly together as shown by Figure 7.

Figure 9:
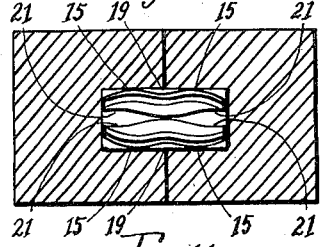
Figure 9 shows the two blocks joined together with dowel pins in position.

The dowel pins 2 with curved outside surface 9 are used in connection with straight bores 17 and 17ª (Figure 8). These dowel pins 2 in combination of two are inserted in bores 17, the two ends 6 of the said dowel pins 2 touching the back 13 of the bore 17. The disengaged ends 6 of the dowel pins 2 are then inserted into the bore 17ª of block 18ª. The dowel pins 2 being made of resilient material—and are originally a little wider at point 15 (Figure 2) when used in combination of two than the diameter of the said straight bores 17 and 17ª—are by insertion and progressive pressure on the two blocks 18 and 18ª to be connected, reduced to a smaller diameter than the bores 17 and 17ª, their contractibility co-operating with the two blocks 18 and 18ª, holding them tightly together as shown by Figure 9.

Neither of the dowel pins 1 and 2—which work on identical principle—touch the centre 19 of any of the blocks (Figure 7 and Figure 9) when the said blocks are connected, this method primarily increasing the force of the dowel pins at point 15 (Figure 7 and Figure 9) where they are in contact with the interior side of the bores of the blocks; secondly enabling the connected blocks to be easily separated and the said dowel pins equally easily withdrawn and handled with facility even by very small children. This method will also add to the resiliency of both dowel pins 1 and 2.

Because the dowel pins accommodate themselves to the diameter of the bores, which are of lesser diameter than the dowel pins in combination of two at point 15, the dowel pins in the bores when the blocks are joined are slightly bent at point 21.

Figure 10:
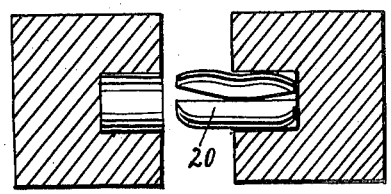
Figure 10 shows dowel pin in combination with ordinary straight circular pin inserted in block with straight hole and in position before blocks are joined. The said ordinary straight circular pin is not a part of my invention.
Figure 11:
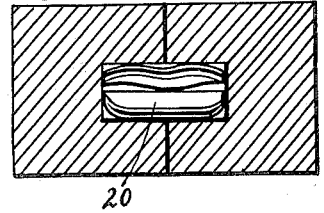
Figure 11 shows the two blocks joined together with a dowel pin and ordinary straight circular pin in position.

Referring to Figures 10 and 11 pins 1 and 2 could be used in combination with ordinary straight circular pin 20 (Figure 10 and Figure 11) which is in no way a part of my invention and the method of working is similar to the others already described.

I claim:

1. A dowel pin comprising two similar semi-cylindrical parts, having their inner-contacting surfaces receding from the middle towards their ends.

2. A dowel pin comprising two similar semi-cylindrical parts, having their innercontacting surfaces receding from the middle towards their ends and their outer surfaces bevelled at their ends.

3. A dowel pin comprising two similar semi-cylindrical parts, having their inner-contacting surfaces receding from the middle towards their ends and their outer surfaces curved inwardly in the middle and bevelled at the ends.

4. In a dowel pin, a semi-cylindrical member having its inner surface receding from the middle towards the ends and its outer surface bevelled at the ends adapted to cooperate with a plane semi-cylindrical member.

5. In a dowel pin, a semi-cylindrical member having its inner surface receding from the middle towards the ends and its outer surface inwardly curved at the middle and bevelled at the ends, adapted to cooperate with a plane semi-cylindrical member.

RUDOLF KRŇANSKÝ.